United States Patent Office 3,655,647
Patented Apr. 11, 1972

3,655,647
AZEPINOINDOLONES
Jackson B. Hester, Jr., Portage, Mich., assignor to The Upjohn Company, Kalamazoo, Mich.
No Drawing. Original application Oct. 21, 1966, Ser. No. 588,288, now Patent No. 3,514,462. Divided and this application Mar. 16, 1970, Ser. No. 24,461
Int. Cl. C07d 57/02
U.S. Cl. 260—239.3    2 Claims

ABSTRACT OF THE DISCLOSURE

A 3,4,5,10 - tetrahydroazepino[2,3-b]indol - 1(2H)-one represented by the formula

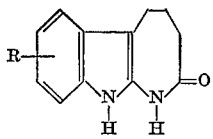

wherein R is a member of the group consisting of hydrogen, alkyl, alkoxy, and halo radicals, wherein the alkyl and alkoxy radicals contain from 1 to 3 carbon atoms, inclusive. Useful intermediate for preparation of pharmacologically active compounds.

---

This application is a division of application Ser. No. 588,288, filed Oct. 21, 1966, now Pat. No. 3,514,462.

This invention is directed to azepinoindoles.

Contemplated herein are 3,4,5,10 - tetrahydroazepino [3,4-b]indoles represented by the structural formula (I)

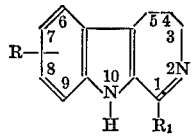

and
3,4,5,10 - tetrahydroazepino[2,3-b]indoles represented by the structural formula (II)

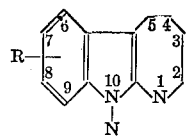

In the foregoing structural formulas R can be a hydrogen, alkyl, alkoxy, or halo radical and $R_1$ can be amino, alkylamino, piperidino, 1-pyrrolodinyl, morpholino, or a (N,N-dialkylaminoalkyl)amino group represented by the formula

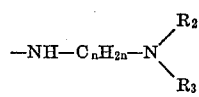

where $R_2$ and $R_3$ are alkyl radicals and $n$ is an integer having a value from 2 to 4, inclusive. The alkyl portion of any of the foregoing radicals or groups can contain from 1 to 3 carbon atoms, inclusive.

Thus, illustrative alkyl radicals are methyl, ethyl, propyl, and isopropyl; illustrative alkoxy radicals are methoxy, ethoxy, propoxy, and isopropoxy; and illustrative halo radicals are fluoro, chloro and bromo.

Illustrative alkylamino groups are methylamino, ethylamino, propylamino, and isopropylamino; and illustrative (N,N - dialkylaminoalkyl)amino groups are (N,N-dimethylaminoethyl)amino), (N,N - dimethylaminopropyl) amino, (N,N-dimethylaminobutyl)amino, (N,N-diethylaminopropyl)amino, (N,N - dipropylaminopropyl) amino, (N-ethyl-N-propylaminobutyl)amino, and the like.

Also contemplated within the purview of the present invention are the acid addition salts of the aforedescribed compounds. Stable acid addition salts can be formed with acids such as hydrochloric, hydrobromic, sulfuric, phosphoric, nitric, acetic, benzoic, salicyclic, glycolic, succinic, nicotinic, tartaric, maleic, malic, lactic, pamoic, methanesulfonic, picric, cyclohexanesulfamic, lactic and the like.

The overall reaction scheme for the preparation of the compounds of this invention is set forth below, with R and $R_1$ having the same meaning as before. Ac designating an acetyl group, Et designating an ethyl group, and Tos designating a toluenesulfonyl group:

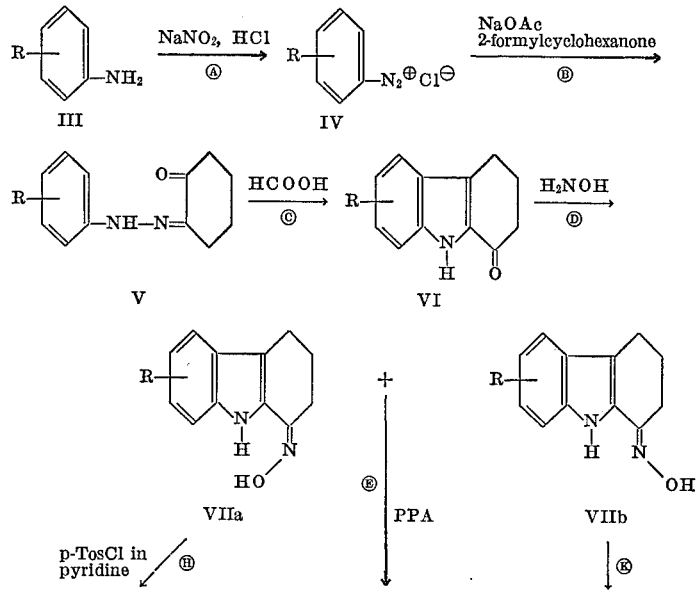

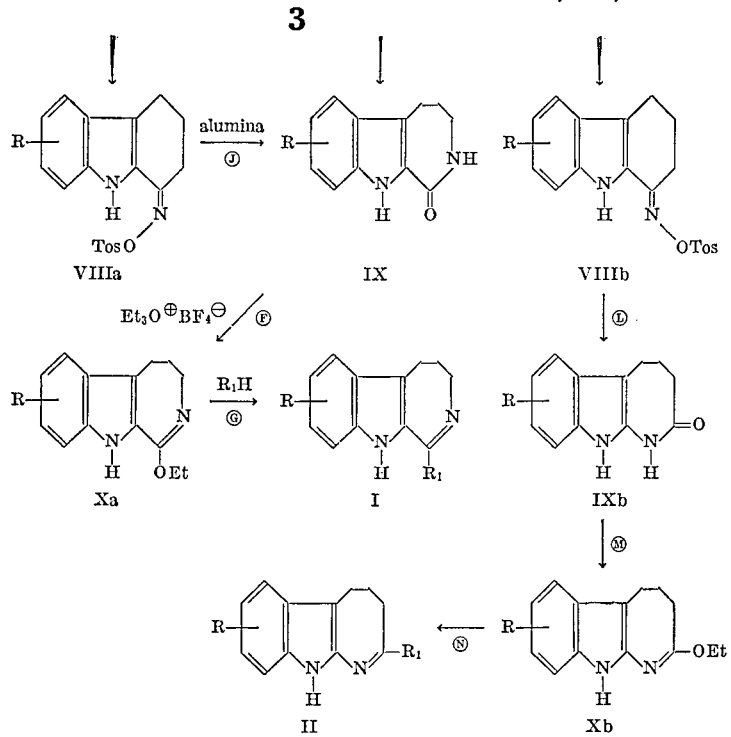

The compounds of this invention can be prepared by first reacting a substituted or unsubstituted aniline (III), a well-known class of compounds, with an aqueous solution of sodium nitrite at a temperature in the range from about —4° C. to about 5° C., and preferably at about 0° C., and in the presence of dilute hydrochloric acid, so as to produce the corresponding diazonium salt (IV). (Step A.)

Thereafter, the diazonium salt can be reacted at about —4° C. to about 5° C., and preferably at about 0° C., with 2-formylcyclohexanone to produce the corresponding monophenylhydrazone of cyclohexane-1,2-dione(V). The reaction can be brought about by combining an aqueous solution of the diazonium salt with a mixture of sodium acetate, water, and 2-formylcyclohexanone. The 2-formylcyclohexanone used as a reactant in this step can be prepared in accordance with the teachings of Rupe et al., Helv. Chim. Acta 21, 1538 (1938). The procedure for the preparation of the monophenylhydrazone of cyclohexane-1,2-dione is taught by Bhide et al., Tetrahedron 10, 230 (1960). (Step B.)

Refluxing of the monophenylhydrazone of cyclohexane-1,2-dione with 80 to 100 weight percent formic acid for a time period of from about 1 to about 5 hours, preferably about 1 hour, yields the corresponding 1-keto-1,2,3,4-tetrahydrocarbazole (VI) as per the teachings of Coffey, Rec. trav. chim. 42, 528 (1923). (Step C.)

An aqueous solution of the 1-keto-1,2,3,4-tetrahydrocarbazole can then be refluxed with hydroxylamine hydrochloride and sodium acetate in a suitable solvent such as an ethanol-water mixture for a time period from about 5 to about 10 hours, and preferably for about 5 hours. Two isomers of 1-keto-1,2,3,4-tetrahydrocarbazole oxime (VIIa and VIIb) are produced by this reaction. The isomers can be separated by either silica gel chromatography or by fractional crystallization, if desired. (Step D.)

Either isomer singly or both together can be reacted with polyphosphoric acid (PPA) by heating for about 10 to 15 minutes at a temperature of about 100° to about 120° C., to produce 3,4,5,10-tetrahydro[3,4-b]indol-1-(2H)-one (IX). (Step E.)

The 3,4,5,10-tetrahydro[3,4-b]indol - 1(2H) - one produced in Step E can then be reacted with triethyloxonium fluoborate [prepared by adding epichlorhydrin to a solution of boron trifluoride etherate in ether as per the teachings of Meerwein et al., J. Prakt. Chem. 147(2), 257 (1937)] in a haloaliphatic solvent such as methylene chloride, ethylene dichloride, or the like. The reaction mixture can be permitted to stand at a temperature in the range from about 25° to about 50° C. and preferably at about 25° CC., for a time period in the range from about 10 to about 24 hours, and preferably for about 18 hours. The thus obtained reaction product is a 1-ethoxy-3,4,5,10-tetrahydroazepino[3,4-b]indole (Xa). (Step F.)

This reaction product from Step F can be converted to the end product 3,4,5,10-tetrahydroazepino[3,4-b]indole (I) by heating an admixture of ammonia or an amine which provides the desired substituent in the 1-position of the end product, together with an acid catalyst such as sulfuric acid, hydrochloric acid, p-toluenesulfonic acid, or the like, and a 1-ethoxy-3,4,5,10-tetrahydroazepino[3,4-b]indole for about 15 to about 48 hours, at a temperature in the range from about 80° to about 150° C., depending on the particular amine employed. Optionally, an aromatic solvent such as benzene, toluene, xylene, or the like, can be employed. If ammonia or a low boiling amine is employed, the reaction is usually carried out under elevated pressure. (Step G.)

The syn-isomer (VIIa) produced in Step D, above, can alternately be reacted with p-toluenesulfonyl chloride in a pyridine solution at a temperature in the range from about 0° to about 30° C., and preferably at about 25° C., for a time period of from about 6 hours to about 24 hours, and preferably for about 18 hours, to produce the corresponding oxime tosylate (VIIIa). (Step H.)

The oxime tosylate produced in Step H can be converted to the corresponding 3,4,5,10-tetrahydroazepino[3,4-b]-indol-1(2H)-one (IX) by dissolving the oxime tosylate in an aromatic solvent such as benzene, adsorbing on a chromatographic column prepared with about 40 to 100 times the weight of the oxime tosylate of neutral alumina that has been previously deactivated with water (from about 0.5 to about 1 weight percent), and thereafter eluting with a mixture of methanol and chloroform.(Step J.)

The lactam obtained from Step J can be converted to the end product 3,4,5,10-tetrahydroazepino[3,4-b]indole (I) by following the procedures set forth in Steps F and G.

The anti-isomer (VIIb) of 1-keto-1,2,3,4-tetrahydrocarbazole oxime produced in Step D, above, can be converted to the corresponding oxime tosylate (VIIIb) following the procedure of Step H. (Step K.)

The oxime tosylate produced in Step K can be converted to the corresponding 3,4,5,10-tetrahydroazepino-[2,3-b]indol-2(1H)one (IXb) by a procedure analogous to Step J. (Step L.)

Similarly, the procedures of Steps F and G can be employed to convert the lactam of Step L to the corresponding 2 - ethoxy-3,4,5,10-tetrahydroazepino[2,3-b]indole (Xb) which, in turn, can be converted to the end product 3,4,5,10 - tetrahydroazepin[2,3-b]indole (II). (Steps M and N, respectively.)

The compounds of this invention shown by Formulas I and II reduce anxiety and fighting behavior in animals, including mammals. These compounds are useful for normalizing hyperactive (e.g., anxiety) and depressed mental states in animals.

In addition, the compounds of this invention represented by Formulas I and II form salts with fluosilicic acid which are useful as mothproofing agents in accordance with the teachings of U.S. Pat. No. 1,915,334 and U.S. Pat. No. 2,075,359. Salts can also be formed with thiocyanic acid which, in turn, condense with formaldehyde and produce resinous materials useful as pickling inhibitors according to U.S. Pat. No. 2,425,320 and U.S. Pat. No. 2,606,155. Moreover, salts wtih trichloroacetic acid are useful as herbicides against Johnson grass, yellow foxtail, green foxtail, Bermuda grass, quack grass, and the like.

The lactams represented by Formulas IX and IXb, and the compounds represented by Formulas Xa and Xb are useful as intermediates for the preparation of the compounds shown by I and II.

When used pharmacologically as set forth above, for purposes of administration, the compounds of Formulas I and II can be combined with solid or liquid pharmaceutical carriers and formulated in the form of tablets, powder packets, or capsules, using starch and similar excipients, or dissolved or suspended in suitable solvents or vehicles for oral or parenteral administration.

This invention is further illustrated by the following examples:

EXAMPLE I

*Preparation of 2-formylcyclohexanone*

Methanol (about 4.5 grams) was dissolved in diethyl ether (about 50 milliliters) and the solution was added slowly to a stirred suspension of sodium hydride (about 110 grams, 2.53 moles; in the form of a 55 wt. percent suspension in mineral oil) in dry diethyl ether (about 2.5 liters).

A mixture of cyclohexanone (about 247 grams, 2.53 moles) and ethyl formate (about 204.7 grams, 2.76 moles) was added to the resulting sodium hydride suspension gradually over a time period of about 3.5 hours. The rate of addition was such that the produced reaction mixture refluxed gently. After the addition was completed, the obtained admixture containing reaction products was refluxed for about 1.5 hours and then permitted to stand at about room temperature for about 18 hours.

Thereafter, the obtained admixture was poured into ice water (about 5 liters). An aqueous layer and an ether layer resulted. The layers were separated from each others, and the aqueous layer washed with diethyl ether. The ether layer was washed once with an aqueous 5 weight percent sodium hydroxide solution.

The aqueous layer was then combined with the sodium hydroxide wash solution and the combined aqueous solution was cooled in an ice bath, saturated with sodium chloride, and acidified with acetic acid. The acidified solution was then extracted with diethyl ether, and the extracts washed with brine, dried over magnesium sulfate, and concentrated by evaporation of the diethyl ether.

The concentrated residue was distilled and about 206.8 grams of a liquid having a boiling point of about 77–81° C./15 mm. of Hg was obtained. The liquid was identified as 2-formylcyclohexanone.

EXAMPLE II

*Preparation of monophenylhydrazine of cyclohexane-1,2-dione*

Benzenediazonium chloride was prepared by adding a solution of sodium nitrile (about 43.5 grams, 0.63 mole) in water (about 500 milliliters) to a solution of aniline (about 46.5 grams, 0.5 mole) in concentrated hydrochloric acid (about 135 milliliters) and water (about 500 milliliters) maintained at a temperature in the range from about 0° to 5° C.

The resulting benzenediazonium chloride solution was added, with stirring, and over a time period of about 30 minutes, to an admixture of sodium acetate (about 125 grams, 1.52 moles) and 2-formylcyclohexanone (about 63 grams, 0.515 mole) in water (about 1125 milliliters). The latter admixture was prepared by gradually combining the sodium acetate, dissolved in about 375 milliliters of water, with a cold (about 0° C.) mixture of the 2-formylcyclohexanone and about 750 milliliters of water. During the addition, the resulting reaction mixture was maintained at a temperature in the range from about 0° to about 5° C.

After the addition of the benzenediazonium chloride solution was completed, the reaction mixture was maintained at about 0° C. and stirred for about one hour. Thereafter, the reaction mixture was filtered and a yellow solid recovered. The yellow solid was washed with water and recrystallized from methanol. About 50 grams of a solid melting at about 188°–190° C. was produced. The solid was identified as the monophenylhydrazone of cyclohexane-1,2-dione, obtained in about 43 percent yield.

In a similar manner, but employing 2-bromoaniline the 2-bromophenylhydrazone of cyclohexane-1,2-dione can be prepared, employing 4-bromoaniline the 4-bromophenylhydrazine of cyclohexane-1,2-dione can be prepared, employing 3-chloroaniline the 3-chlorophenylhydrazone of cyclohexane-1,2-dione can be prepared, employing 2-chloroaniline the 2-chlorophenylhydrazone of cyclohexane-1,2-dione can be prepared, employing 4-ethoxyaniline the 4-ethoxyphenylhydrazone of cyclohexane-1,2-dione can be prepared, employing 3-fluoroaniline the 3-fluorophenylhydrazone of cyclohexane-1,2-dione can be prepared, employing 3-methoxyaniline the 3-methoxyphenylhydrazone of cyclohexene-1,2-dione can be prepared, employing 2-methylaniline the 2-methylphenylhydrazone of cyclohexane-1,2-dione can be prepared, employing 3-ethylaniline the 3-ethylphenylhydrazone of cyclohexane-1,2-dione can be prepared, employing 4-propylaniline the 4-propylphenylhydrazone of cyclohexane-1,2-dione can be prepared, employing 4-propoxyaniline the 4-propoxyphenylhydrazone of cyclohexane-1,2-dione can be prepared, etc.

EXAMPLE III

*Preparation of 1-keto-1,2,3,4-tetrahydrocarbazole*

Monophenylhydrazone of cyclohexane-1,2-dione (about 3 grams, 24.7 millimoles) and 80 weight percent formic acid (about 25 milliliters) were combined and refluxed for about one hour. A dark mixture was obtained, poured into ice, and thereafter filtered.

Upon filtration, a solid product was recovered, washed with water, and recrystallized from methanol. About 3.8 grams of a solid melting at about 168–170° C. was produced. The solid was identified as 1-keto-1,2,3,4-tetrahydrocarbazole, obtained in about 84 percent yield.

EXAMPLE IV

*Preparation of 1-keto-1,2,3,4-tetrahydrocarbazole oxime*

(a) A mixture of 1-keto-1,2,3,4-tetrahydrocarbazole (about 3.75 grams, 20.3 millimoles), hydroxylamine hydrochloride (about 2.11 grams, 30.4 millimoles), sodium acetate (about 2.49 grams, 30.4 millimoles), ethanol (about 70 milliliters), and water (about 17.5 milliliters)

was prepared and refluxed under nitrogen for about five hours. Thereafter, the mixture was permitted to stand at about room temperature for about 18 hours and then concentrated by evaporation under reduced pressure.

The obtained residue was diluted with water and extracted with diethyl ether. The diethyl ether extracts were washed with brine, dried over magnesium sulfate, and then concentrated by evaporation in vacuo. The residue remaining after evaporation was crystallized from an ethyl acetate-mixed hexanes mixture. About 0.375 gram of a solid melting at about 175.5°–176.5° C. was obtained. The solid was identified as the syn-isomer of 1-keto-1,2,3,4-tetrahydrocarbazole oxime.

*Analysis.*—Calcd. for $C_{12}H_{12}N_2O$ (percent): C, 71.98; H, 6.04; N, 13.99. Found (percent): C, 71.58; H, 5.98; N, 14.12.

(a) The mother liquor from the foregoing crystallization was concentrated by evaporation and the obtained residue was chromatographed on silica gel (about 200 grams) with 30 volume percent ethyl acetate-70 volume percent mixed hexanes. The first band recovered from the silica gel was recrystallized from diethyl ether-mixed hexanes. About 1.33 grams of a solid melting at about 130°–141° C. was obtained. After another recrystallization from the same solvent mixture, the melting point was about 129–136° C. The solid was identified as the anti-isomer of 1-keto-1,2,3,4-tetrahydrocarbazole oxime.

*Analysis.*—Calcd. for $C_{12}H_{12}N_2O$ (percent): C, 71.98; H, 6.04; N, 13.99. Found (percent): C, 72.24; H, 6.19; N, 14.16.

EXAMPLE V

Preparation of 3,4,5,10-tetrahydroazepino[3,4-b]indol-1(2H)-one

The anti-isomer of 1 - keto-1,2,3,4-tetrahydrocarbazole oxime (about 965 milligrams, 4.82 millimoles) and polyphosphoric acid (about 30 grams) were admixed, stirred, and heated. The heating was carried out under nitrogen and in an oil bath which was heated from about 102° C. to about 112° C. in about two minutes and thereafter maintained at a temperature in the range from about 112° C. to about 118° C. for about 15 minutes.

After heating, the obtained admixture was cooled and poured into a stirred mixture of ice and water. A solid was recovered therefrom by filtration after hydrolysis of the polyphosphoric acid. The recovered solid was washed with water, dried, and crystallized from methylene chloride-methanol. About 623 milligrams of crystals melting at about 220.5°–228.5° C. was obtained. Several recrystallizations from methylene chloride-methanol raised the melting point to about 228°–229° C. The crystals were identified as 3,4,5,10 - tetrahydroazepino[3,4-b]indol-1-(2H)-one, obtained in about 64.7 percent yield.

*Analysis.*—Calcd. for $C_{12}H_{12}N_2O$ (percent): C, 71.98; H, 6.04; N, 13.99. Found (percent): C, 71.72; H, 6.22; N, 13.96.

EXAMPLE VI

Preparation of 3,4,5,10-tetrahydroazepino[3,4-b]indol-1(2H)-one

In a manner analogous to that of Example V, the syn-isomer of 1-keto-1,2,3,4-tetrahydrocarbazole oxime was rearranged to yield a solid identical to that obtained in Example V. The melting point was observed to be about 228°–229° C., the mixed melting point was undepressed, and the infrared spectra (chloroform) were identical.

EXAMPLE VII

Preparation of 3,4,5,10-tetrahydroazepino[3,4-b]indol-1(2H)-one

The syn-isomer of 1-keto-1,2,3,4,-tetrahydrocarbazole oxime (about 10 grams, 0.05 mole) was dissolved in pyridine (about 250 milliliters), cooled in an ice bath to a temperature of about 4° C., and thereafter treated with p-toluenesulfonyl chloride (about 10.5 grams, 0.0552 mole). Thereafter the resulting admixture was allowed to warm to about room temperature and to stand for about 18 hours.

Subsequently, water was added thereto, and the resulting mixture was concentrated by evaporation under reduced pressure. The produced residue was filtered and about 17.3 grams of a crystalline product was recovered. The product was washed and dried, and its melting point determined. The melting point was observed to be about 132°–135° C. (dec.), and the product was identified as the syn-isomer of 1-keto-1,2,3,4-tetrahydrocarbazole oxime tosylate.

The oxime tosylate (about 9 grams, 0.0254 mole) was dissolved in benzene and was adsorbed on a column of neutral alumina (about 600 grams) which had been deactivated with water (about 1 weight percent). The column was prepared by pouring dry alumina into a column filled with mixed hexanes.

The column was developed successively with benzene (about 1 liter), a 50 volume percent benzene-50 volume percent chloroform mixture (about 2 liters), and with chloroform (about 1.5 liters). Thereafter, a product was eluted from the column with a 20 volume percent methanol-80 volume percent chloroform mixture and crystallized from methanol-methylene chloride. About 3.01 grams of a crystalline product melting at about 228°–229.5° C., about 0.854 gram of a crystalline product melting at about 222.5°–224° C., and about 0.352 gram of a crystalline product melting at about 220°–222.5° C. were obtained. The infrared spectrum of the obtained product was compared to that of the product obtained in Example V and was found to be identical. The product produced as a result of the foregoing procedure was identified as 3,4,5,10 - tetrahydroazepino[3,4-b]indol-1(2H)-one, obtained in about 82.9 percent yield.

EXAMPLE VIII

Preparation of 3,4,5,10-tetrahydroazepino[2,3-b]indol-2(1H)-one

The anti-isomer of 1 - keto-1,2,3,4-tetrahydrocarbazole oxime (about 9.21 grams, 0.046 mole) was dissolved in pyridine (about 230 milliliters), cooled in an ice bath to a tempearture of about 4° C., and treated with p-toluenesulfonyl chloride (about 10 grams, 0.0525 mole). Thereafter the resulting admixture was allowed to warm to about room temperature and to stand for about 18 hours.

Subsequently, water was added thereto, and the resulting mixture was concentrated by evaporation under reduced pressure. The resulting residue was filtered and about 15.2 grams of a crystalline solid was obtained. The solid was washed with water and dried, and its melting point was observed to be about 137°–143° C. (dec.). After dissolution in ethyl acetate, decolorization with activated charcoal, and recrystallization from ethyl acetate-mixed hexanes, the melting point was raised to about 163°–165° C. (dec.). The obtained crystalline solid was identified as the anti-isomer of 1-keto-1,2,3,4-tetrahydrocarbazole oxime tosylate.

The recrystallized oxime tosylate (about 2.5 grams, 7.07 millimoles was dissolved in benzene and adsorbed on a column of Woeim neutral alumina (about 300 grams) which had been deactivated with water (about 0.5 weight percent). The column was developed with benzene and chloroform. A product was eluted from the column with 20 volume percent methanol-80 volume percent chloroform and crystallized from methanol-ethyl acetate. About 303 milligrams of crystals melting at about 200°–204° C. (dec.) was obtained. These crystals were dissolved in methanol, decolorized with activated charcoal, and recrystallized several times from methanol-ethyl acetate to produce crystals melting at about 205.5°–206.5° C. The crystals were identified as 3,4,5,10-tetrahydroazepino[2,3-b]indol-2(1H)-one.

*Analysis.*—Calcd. for $C_{12}H_{12}N_2O$ (percent): C, 71.98; H, 6.04; N, 13.99. Found (percent): C, 71.90; H, 5.61; N, 14.28.

EXAMPLE IX

*Preparation of 1-ethoxy-3,4,5,10-tetrahydroazepino-[3,4-b]indole*

Triethyloxonium fluoroborate was prepared by the method of Meerwein, J. Prakt. Chem. 147 (2), 257 (1937). To a stirred solution of freshly distilled boron trifluoride etherate (about 4.06 milliliters) in dry diethyl ether (about 20 milliliters) maintained under nitrogen was added, dropwise, epichlorohydrin (about 1.88 milliliters). The resulting mixture was permitted to stand at room temperature for about two hours, thereafter the diethyl ether was decanted, and the remaining semi-solid residue was washed with dry diethyl ether.

The semi-solid residue, which was triethyloxonium fluoroborate, was dissolved in methylene chloride (about 10 milliliters), and the resulting solution was slowly added to a stirred suspension of 3,4,5,10-tetrahydro-[3,4-b]indol-1(2M)-one (about 3 grams, 15 millimoles) in dry methylene chloride (about 250 milliliters) maintained at about 10°–15° C. The preferred mixture was allowed to stand at room temperature for about 18 hours and then filtered.

A solid material was recovered, washed with methylene chloride, and dried in vacuo. The material was found to be insoluble in most organic solvents; it appear to be a complex. The material was added to cold, dilute aqueous potassium carbonate solution, and the obtained admixture was extracted with methylene chloride.

The methylene chloride extract was washed with water, dried over potassium carbonate, and concentrated by evaporation under reduced pressure. The produced residue was crystallized from ethyl acetate-mixed hexanes, and about 1.65 grams of crystals melting at about 122.5°–124° C. was obtained. Recrystallization from mixed hexanes did not change the melting point. The crystals were identified as 1-ethoxy-3,4,5,10-tetrahydroazepino[3,4-b]indole, obtained in about 48.3 percent yield.

*Analysis.*—Calcd. for $C_{14}H_{16}N_2O$ (percent): C, 73.65; H, 7.06; N, 12.27. Found (percent): C, 73.85; H, 7.27; N, 12.26.

EXAMPLE X

*Preparation of 1-{[2-(diethylamino)ethyl]amino}-3,4,5,10-tetrahydroazepino[3,4-b]indole*

A mixture of 1-ethoxy - 3,4,5,10 - tetrahydroazepino-[3,4-b]indole (about 4.56 grams, 0.02 mole), N,N-diethylenediamine (about 14 grams), p-toluenesulfonic acid hydrate (about 800 milligrams), and benzene (about 200 milliliters) was refluxed under nitrogen for about 15 hours. During the initial stages of the reaction, ethanol-and-water azeotrope was distilled form the mixture through a small, helix-packed column.

After the refluxing was completed, the mixture was cooled and poured into water and the reaction product was extracted therefrom with ether. The obtained ether extract was washed with water and brine, dried over potassium carbonate, and concentrated by evaporation under reduced pressure. The obtained residue was crystallized from ethyl acetate-mixed hexanes. About 4.37 grams of a product melting at about 143.5°–145° C. and about 0.848 gram of a product melting at about 141.5°–143.5° C. were obtained. Further recrystallization from ethyl acetate mixed hexanes gave crystals melting at about 144.5°–145.5° C. The product was identified as 1-{[2-(diethylamino)ethyl]amino} - 3,4,5,10 - tetrahydroazepino[3,4-b]indole obtained in about 87.7 percent yield.

*Analysis.*—Calcd. for $C_{18}H_{20}N_4$ (percent): C, 72.44; H, 8.78; N, 18.78. Found (percent): C, 72.45; H, 9.00; N, 18.61.

In an analogous manner, but replacing N,N-diethylethylenediamine with N,N - diethyltrimethylenediamine, 1-{[3-(diethylamino)propyl]amino} - 3,4,5,10 - tetrahydroazepino[3,4-b]indole can be prepared; using N,N-dimethyltetramethylenediamine, 1-{[4-(dimethylamino)butyl]amino} - 3,4,5,10 - tetrahydroazepino[3,4-b]indole can be prepared; using N,N-dipropyltetramethylenediamine, 1-{[4-(dipropylamino)butyl]amino}-3,4,5,10-tetrahydroazepino[3,4-b]indole can be prepared.

EXAMPLE XI

*Preparation of 3,4,5,10-tetrahydro-1-piperidnio-azepino[3,4-b]indole hydrochloride dihydrate*

1 - ethoxy - 3,4,5,10 - tetrahydroazepino[3,4-b]indole (about 5.75 grams, 0.0252 mole) was added to a cold, stirred mixture of sullfuric acid (about 0.63 milliliter) and piperidine (about 63 milliliters), and the resulting mixture refluxed under nitrogen for about 36 hours.

After the refluxing was completed, the mixture was poured into ice water, and the obtained admixture was treated with 50 weight percent aqueous sodium hydroxide solution (about 1.5 milliliters) and then extracted with diethyl ether. The obtained ether extract was washed with brine, dried over potassium carbonate, and concentrated by evaporation under reduced pressure.

The residue after evaporation was chromatographed on silica gel (about 1.1 kilograms). The unreacted starting material present was eluted from the column with methanol and the reaction product was eluted with 2 volume percent acetic acid-98 volue percent methanol as the corresponding acetic acid salt. Thits salt was dissolved in water and the resulting solution made alkaline with a 50 weight percent aqueous solution of sodium hydroxide.

Upon addition of the alkaline solution a white precipitate was formed and was recovered by filtration, washed with water, and dried. Thereafter, the precipitate was suspended in ethyl acetate and acidified with methanolic hydrogen chloride. The resulting salt was twice recrystallized from water, given crystals melting at about 150°–153° C. (dec.) (softening at about 133° C.) The crystals were identified as 3,4,5,10-tetrahydro - 1 - piperidinoazepino-[3,4-b]indole hydrochloride dihydrate, obtained in about 26.9 percent yield.

*Analysis.*—Calcd. for $C_{17}H_{21}N_3 \cdot HCl \cdot 2H_2O$ (percent): C, 60.08; H, 7.71; N, 12.36; Cl, 10.43; $H_2O$, 10.60. Found (percent): C, 60.46; H, 7.83; N, 12.43; Cl, 10.53; $H_2O$, 10.46.

EXAMPLE XII

*Preparation of 3,4,5,10-tetrahydro-1-(1-pyrrolidinyl) azepino[3,4-b]indole hydrochloride*

In a manner analogous to Example XI, 1-ethoxy-3,4,5,10-tetrahydroazepino[3,4-b]indole can be reacted with pyrrolidine to produce 3,4,5,10-tetrahydro-1-(1-pyrrolidinyl)azepino[3,4-b]indole hydrochloride.

EXAMPLE XIII

*Preparation of 3,4,5,10-tetrahydro-1-morpholno-azepino[3,4-b]indole hydrochloride*

In a manner analogous to Example XI, 1-ethoxy-3,4,5, 10-tetrahydroazepino[3,4-b]indole can be reacted with morpholine to produce 3,4,5,10-tetrahydro-1-morpholino-azepino[3,4-b]indole hydrochloride.

EXAMPLE XIV

*Preparation of 1-methylamino-3,4,5,10-tetrahydroazepino[3,4-b]indole*

In a manner analogous to Example X, a mixture of 1-ethoxy-3,4,5,10-tetrahydroazepino[3,4 - b]indole, methylamine, p-toluene-sulfonic acid, and benzene, can be heated under nitrogen, in a sealed reaction vessel, to produce 1-methylamino-3,4,5,10-tetrahydroazepino[3,4-b]indole.

Similarly, using ethylamine, 1-ethylamino-3,4,5,10-tetrahydroazepino[3,4-b]indole can be produced; using propyl-amine, 1-propylamino - 3,4,5,10 - tetrahydroazepino[3,4-b]indole can be produced.

EXAMPLE XV

*Preparation of 2-ethoxy-3,4,5,10-tetrahydroazepino[2,3-b]indole*

In a manner similar to Example IX, 3,4,5,10-tetrahydroazepino[2,3-b]indol-2(1H)-one can be reacted in methylene chloride with triethyloxonium fluoroborate to produce 2-ethoxy-3,4,5,10-tetrahydroazepino[2,3-b]indole.

EXAMPLE XVI

*Preparation of 2-[[2-(diethylamino)ethyl]amino]-3,4,5,10-tetrahydroazepino[2,3-b]indole*

Following the procedure of Example X, a mixture of 2-ethoxy-3,4,5,10-tetrahydroazepino[2,3-b]indole, N,N-diethyl-ethylenediamine, p-toluenesulfonic acid, and benzene can be refluxed under nitrogen to produce 2-[[2-(diethylamino)ethyl] - amino]-3,4,5,10-tetrahydroazepino[2,3-b]indole. The product can be recovered from the reaction mixture using conventional laboratory procedures.

EXAMPLE XVII

*Preparation of 1-[[2-(diethylamino)ethyl]amino]-3,4,5,10-tetrahydroazepino[3,4-b]indoles*

Following in sequence the procedures set forth in Examples III, IV, V, IX, and X but employing 2-bromophenylhydrazone of cyclohexane-1,2-dione in the procedure of Example III, 1-[[2-(diethylamino)ethyl]amino]-9-bromo-3,4,5,10-tetrahydroazepino[3,4-b]indole can be prepared; employing 3-chlorophenylhydrazone of cyclohexane-1,2-dione, a mixture of 1-[[2-(diethylamino)ethyl]amino]-8-chloro-3,4,5,10-tetrahydroazepino[3,4-b]indole and 1-[[2-(diethylamino)ethyl]amino] - 6 - chloro-3,4,5,10-tetrahydroazepino[3,4-b]indole can be prepared, which can be separated by chromatography; employing 2-chlorophenylhydrazone of cyclohexane-1,2-dione, 1-[[2-(diethylamino)ethyl]amino] - 9-chloro-3,4,5,10-tetrahydroazepino[3,4-b]indole can be prepared; employing 4-ethoxyphenylhydrazone of cyclohexane-1,2-dione, 1-[[2-(diethylamino)ethyl]amino] - 7-ethoxy-3,4,5,10-tetrahydroazepino[3,4-b]indole can be prepared; employing 3-fluorophenylhydrazone of cyclohexane-1,2-dione, a mixture of 1-[[2-(diethylamino)ethyl]amino] - 8-fluoro-3,4,5,10-tetrahydroazepino[3,4-b]indole and 1-[[2-(diethylamino)ethyl]amino]-6-fluoro-3,4,5,10-tetrahydroazepino[3,4-b]indole can be prepared, which can be separated by chromatography; employing 4-propylphenylhydrazone of cyclohexane-1,2-dione, 1 - [[2-(diethylamino)ethyl]amino]-7-propyl-3,4,5,10 - tetrahydroazepino[3,4 - b]indole can be prepared; employing 4-propoxyphenylhydrazone of cyclohexane-1,2-dione, 1 - [[2-(diethylamino)ethyl]amino]-7-propoxy-3,4,5,10-tetrahydroazepino[3,4-b]indole can be prepared, etc.

I claim:

1. A 3,4,5,10-tetrahydroazepino[2,3-b]indol-1(2H)-one represented by the formula

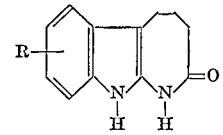

wherein R is a member of the group consisting of hydrogen, alkyl, alkoxy, and halo radicals, with the proviso that the foregoing alkyl and alkoxy radicals contain from 1 to 3 carbon atoms, inclusive.

2. The compound in accordance with claim 1 wherein R is hydrogen.

References Cited

Jackson and Manske, J. Am. Chem. Soc., vol. 52, pp. 5029–5035 (1930).

Teuber et al., Leibigs Ann. der. Chem., Band 696, pp. 116–135 (August 1966).

HENRY R. JILES, Primary Examiner

R. T. BOND, Assistant Examiner

U.S. Cl. X.R.

260—315, 326.5 B, 326.9, 326.81, 293.78, 247.5

UNITED STATES PATENT OFFICE
CERTIFICATE OF CORRECTION

Case 2219A

Patent No. 3,655,647                    Dated April 11, 1972

Inventor(s) Jackson B. Hester, Jr.

It is certified that error appears in the above-identified patent and that said Letters Patent are hereby corrected as shown below:

Column 2, line 5, for "  " read -- 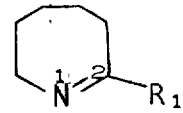 --.

Column 6, line 6, for "nitrile" read -- nitrite --. Column 6, line 36, for "4-bromophenylhydrazine" read -- 4-bromophenylhydrazone --. Column 6, line 58, for "3 grams" read -- 5 grams --. Column 9, line 23, for "-1(2M)-" read -- -1(2H)- --. Column 9, line 68, for "acetate mixed" read -- acetate-mixed --. Column 9, line 73, for "$C_{18}H_{20}N_4$" read -- $C_{18}H_{26}N_4$ --. Column 10, line 30, for "volue" read -- volume --.

Signed and sealed this 31st day of October 1972.

(SEAL)
Attest:

EDWARD M. FLETCHER, JR.                ROBERT GOTTSCHALK
Attesting Officer                      Commissioner of Patents